C. F. WESTERMANN.
SPRING WHEEL FOR VEHICLES.
APPLICATION FILED NOV. 22, 1916. RENEWED FEB. 15, 1919.
1,320,663.
Patented Nov. 4, 1919.
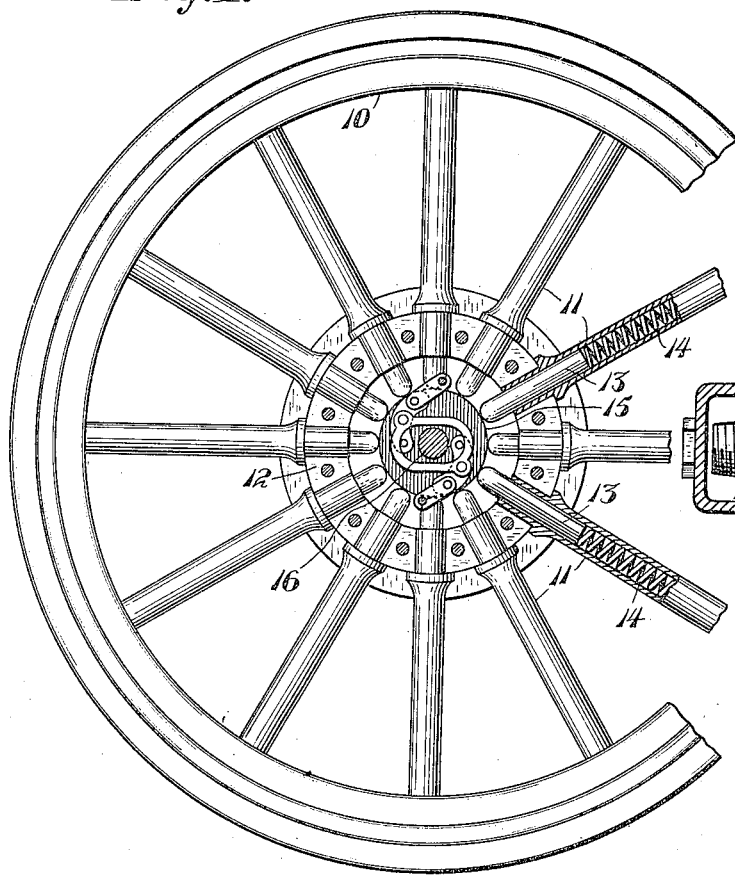
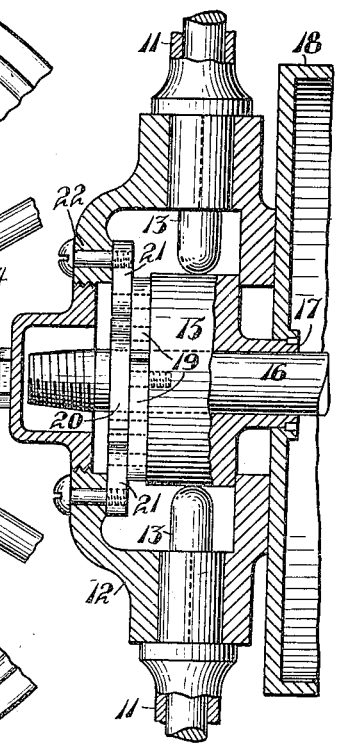
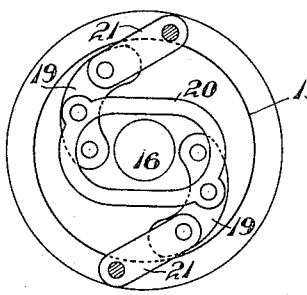
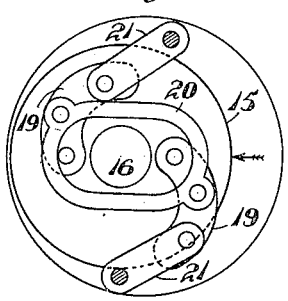
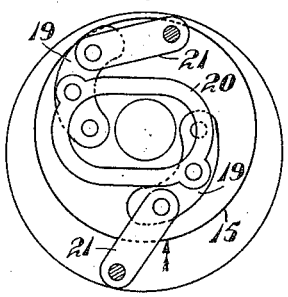
WITNESSES:
INVENTOR
Carl F. Westermann
BY Strong & Townsend
ATTORNEYS

UNITED STATES PATENT OFFICE.

CARL F. WESTERMANN, OF VALLEJO, CALIFORNIA, ASSIGNOR TO SPRING HUB AUTOMOBILE WHEEL CORPORATION, OF SAN FRANCISCO, CALIFORNIA, A CORPORATION OF CALIFORNIA.

SPRING-WHEEL FOR VEHICLES.

1,320,663.      Specification of Letters Patent.      Patented Nov. 4, 1919.

Application filed November 22, 1916, Serial No. 132,802. Renewed February 15, 1919. Serial No. 277,301.

*To all whom it may concern:*

Be it known that I, CARL F. WESTERMANN, a citizen of the United States, residing at Vallejo, in the county of Solano and State of California, have invented new and useful Improvements in Spring-Wheels for Vehicles, of which the following is a specification.

This invention relates to spring wheels for vehicles, and has for its object to provide an improved and simplified connection between the inner and outer hub members, which will permit absolute universal radial motion of the inner hub member, whereby to cushion the shock in any position of the wheel, and yet allow no circumferential relative movement or play between the two hub members, so that the inner hub will drive the outer hub and wheel.

One form which my invention may assume is exemplified in the following description and illustrated in the accompanying drawing in which—

Figure 1. shows a side elevation of a wheel embodying my invention, certain of the parts being broken away to illustrate the interior construction.

Fig. 2. shows a large detailed sectional view taken through the hub horizontally thereof.

Figs. 3, 4 and 5 show diagrammatic views of the connection between the two hub members illustrating different positions thereof.

In the drawing a type of spring wheel is shown which comprises a rim 10, having hollow spokes 11, and an outer hub member 12, held stationarily thereon.

Plungers 13 are slidable in the inner end of the hollow spokes 11, and project beyond the inner circumference of the stationary hub 12 and springs 14 are arranged in said hollow spokes to press inwardly on the plungers 13. A floating hub member 15 is carried within the outer hub 12 and held in place yieldingly by means of the spring pressed plungers 13. The inner hub 15 is secured to the axle 16 of the vehicle and an extension 17 thereon receives the usual brake drum 18.

Rotative motion must be transmitted from the inner hub to the outer hub for driving the wheel, while at the same time the inner hub must be free to move radially in all directions, whereby to cushion the shocks.

I have provided means for this purpose, which afford a universal radial motion of the inner hub, and allows no relative rotative movement whatever between the two hub members. This comprises in its present form a pair of inner links 19, preferably bent, and which are pivoted at one end to the inner hub at diametrically opposite points thereon and extending in opposite directions. A cross link 20, which preferably is in the form of a yoke, and encompasses the axle 16, is pivotally connected to the intermediate portion of each of the links 19, tying said links together for simultaneous movement. A pair of outer links 21, completes the driving connection, each of said links being pivoted at, or near, the outer end of one of the inner links 19, and the two extending in opposite directions where they connect pivotally to a side plate 22, on the outer hub at diametrically opposite points thereon.

Within the limits of motion of the floating hub allowed by the plungers 13, the transmission links above described will not lock or bind radially. Careful study will show that any direction of movement radially may be taken by the inner hub always without any circumferential relative movement being permitted between the two hubs. In other words, the inner hub while retaining the same relative circumferential position with the outer hub may be moved in any direction radially which the shocks in operation transmit to it. Therefore, the driving of a wheel from the inner hub is positive and certain, there being no play whatever between the parts, and that is true whether the wheel be driven forwardly or rearwardly. In this connection however, a pulling strain upon the links is preferable to a pushing strain and accordingly I reverse the arrangement of the links in opposite wheels to form right and left driving connections.

The present device attains a result long sought after in a wheel of this character, namely, a driving connection permitting lateral or radial motion of the inner hub in any direction at all times without requiring a change in the relative circumferential positions of the inner and outer hubs and affords a further advantage in that the connections tend to automatically restore the inner hub to central position once the latter is moved off by vibration from road shocks.

Each pair of links forms an obtuse angle at all times and in some instances they approach a straight line. In Fig. 4 the inner hub is moved horizontally off center and the upper links are almost in a straight line while the lower links still form an angle much greater than a right angle. The tendency of the upper links to assume a straight line is less than that of the lower links and therefore the result is that the inner hub is pulled toward the center by the action of the inner lower link. In Fig. 5 the inner hub is moved vertically upward and the upper links form a smaller angle than the lower links. Therefore the tendency of the upper links to straighten out is imparted to the cross link with sufficient force to bring the inner hub member back to a substantially central position. Therefore, instead of the inner hub being eccentrically disposed within the wheel under normal driving conditions, it will be maintained substantially concentric therewith except during the moments of vibration from road shocks; it being understood that the constant weight of the vehicle will produce slight eccentricity of the hubs.

Various changes in the construction and arrangement of the several parts herein shown and described may be employed without departing from the spirit of my invention as disclosed in the appended claims.

Having thus described my invention, what I claim and desire to secure by Letters Patent is:

1. In a vehicle wheel, an outer stationary hub member, an inner floating hub member, the latter adapted to be received upon the axle, and driving connections between said hub members comprising a pair of bent links pivotally connected to the inner hub member at diametrically opposite points thereof, and extending in opposite directions, a cross member pivotally connected to an intermediate portion of each of said bent links, a pair of outer links, each pivoted to one of said inner links, and extending in opposite directions and pivotally connected at their outer ends to the outer hub member at diametrically opposite points thereon.

2. In a vehicle wheel, the combination of an outer stationary hub, an inner floating hub, and a plurality of oppositely positioned jointed links pivotally connected between said hubs for transmitting rotatable movement from one to the other and a cross member pivotally connected between opposite jointed links, said jointed links in operation maintaining at all times an obtuse angular position and permitting absolute universal radial movement between the hubs without requiring any change in the relative circumferential position of the same.

3. In a vehicle wheel, the combination of an outer stationary hub, an inner floating hub and driving connections between said parts comprising inner swinging links pivotally connected to the floating hub, outer swinging links pivotally connected to the outer hub and to said inner links and a cross member pivotally connected between opposite links, said inner and outer links receiving in normal operation a tensional strain and the whole being operative to permit universal radial movement between the hubs without requiring any change in the relative circumferential positions of said hubs.

4. In a vehicle wheel, the combination of an outer stationary hub and an inner floating hub and rotatable driving connections between said parts comprising inner links pivotally connected to opposite points of the floating hub at their ends and outer links pivotally connected to opposite points of the stationary hub at their ends, said inner and outer links being pivotally connected together at their adjacent ends and a cross link pivotally connecting the inner links together at points intermediate the ends of the latter.

5. In a vehicle wheel, the combination of an outer stationary hub, an inner floating hub and rotatable driving connections between said hubs comprising inner links pivoted to the floating hub at opposite points thereof, outer links pivoted to the stationary hub at opposite points thereof, said inner and outer links being pivotally connected to each other and forming obtuse angles between them and a cross connection between opposite links movable in all directions relative to the inner hub.

6. In a vehicle wheel, the combination of an outer stationary hub, an inner floating hub, the latter carried by the axle and rotatable driving connections between said hubs comprising inner links pivotally connected to opposite points of the floating hub at their ends, outer links pivotally connected to opposite points of the stationary hub at their ends, said inner and outer links being pivotally connected together at their adjacent ends, and a yoke encircling the axle and movable in all directions relative thereto and connected to the inner links at points intermediate the ends of the latter.

In testimony whereof I have hereunto set my hand in the presence of two subscribing witnesses.

CARL F. WESTERMANN.

Witnesses:
JOHN H. HERRING,
W. W. HEALEY.

Copies of this patent may be obtained for five cents each, by addressing the "Commissioner of Patents, Washington, D. C."